United States Patent
Zhang

(10) Patent No.: US 10,901,261 B1
(45) Date of Patent: Jan. 26, 2021

(54) BACKLIGHT ASSEMBLY, DISPLAY DEVICE THEREOF AND APPLICATION THEREOF IN TERMINAL

(71) Applicant: WUHAN CHINA STAR OPTOELECTRONICS TECHNOLOGY CO., LTD, Hubei (CN)

(72) Inventor: Guiyang Zhang, Hubei (CN)

(73) Assignee: WUHAN CHINA OPTOELECTRONICS TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 16/638,759

(22) PCT Filed: Sep. 30, 2019

(86) PCT No.: PCT/CN2019/109297
§ 371 (c)(1),
(2) Date: Feb. 13, 2020

(30) Foreign Application Priority Data

Jul. 29, 2019 (CN) .......................... 2019 1 0690699

(51) Int. Cl.
*G02F 1/13357* (2006.01)
*G06F 1/16* (2006.01)

(52) U.S. Cl.
CPC .. *G02F 1/133605* (2013.01); *G02F 1/133603* (2013.01); *G02F 1/133606* (2013.01); *G06F 1/1605* (2013.01)

(58) Field of Classification Search
None
See application file for complete search history.

(56) References Cited

U.S. PATENT DOCUMENTS

| | | | | |
|---|---|---|---|---|
| 2008/0266901 A1* | 10/2008 | Chang | ................ | G02B 6/0051 362/618 |
| 2009/0021958 A1* | 1/2009 | Chang | ................ | G02B 5/0242 362/607 |
| 2017/0059771 A1* | 3/2017 | Yuki | ................... | G02B 6/0088 |

FOREIGN PATENT DOCUMENTS

| | | |
|---|---|---|
| CN | 207599623 U | 7/2018 |
| CN | 108540603 A | 9/2018 |
| CN | 108663744 A | 10/2018 |
| CN | 109167859 A | 1/2019 |
| CN | 109814299 A | 5/2019 |

(Continued)

*Primary Examiner* — Ashok Patel
(74) *Attorney, Agent, or Firm* — Mark M. Friedman

(57) ABSTRACT

The present invention provides a backlight assembly defined with a camera area. The backlight assembly comprises a substrate layer on which a reflective layer is disposed, and an optical layer is disposed on the reflective layer. The optical layer is provided with a through hole in the camera area, and an annular light-guide film circles a peripheral of the through hole, wherein an inner ring of the light-guide film is concentrically arranged with the through hole. The invention provides a backlight assembly, which introduces an annular light-guide film to control the direction of light propagation in a certain area around the under-screen camera, so that the light is evenly distributed over the camera area, and the camera area can still perform display function by a liquid crystal layer of the screen corresponding to the camera area, thereby providing a new type of under-screen camera solution.

10 Claims, 5 Drawing Sheets

(56) References Cited

FOREIGN PATENT DOCUMENTS

| CN | 110045452 A | 7/2019 |
|---|---|---|
| JP | 2001305535 A | 10/2001 |

\* cited by examiner

BACKLIGHT ASSEMBLY, DISPLAY DEVICE THEREOF AND APPLICATION THEREOF IN TERMINAL

BACKGROUND OF INVENTION

Field of Invention

The invention relates to a field of flat display technology, in particular to a backlight assembly, a display device thereof and an application thereof in a terminal.

Description of Prior Art

It is known that full screen technology is a technology that has been highlighted by the industry in the past two years. Benefits of the full screen are, on one hand, to achieve a higher screen-to-body ratio, on the other hand, to comply with more installation requirements for software, APP, and the like.

In order to improve the screen-to-body ratio, a notch hole screen, a beauty tip screen, and a water drop screen, etc. have been introduced, so as to place functional modules such as a camera, a sensor, and an infrared lens, etc. Recently, a technology of digging a round hole in the display screen has also been developed. The obtained round hole is configured to place an under-screen camera, to realize a screen-to-body ratio reaching 96%. However, at present, the "full screen" promoted in the market is still in a stage of a pseudo-full screen, that is to say, it only has a high screen-to-body ratio, but it is not a "full screen" in the true sense.

However, the above three full screen technologies still need to dig or notch a part of the display screen to expose the camera, allowing external light to enter for photographing, which is one of main reasons why these three technical solutions cannot achieve a true full-screen display solution.

Further, an organic light-emitting diode (OLED) is a self-luminous display technology, which allows the camera to place under the screen by certain technologies without impacting the display function at the position where the camera is located, resulting in a screen-to-body ratio of close to 100%. However, a conventional liquid crystal display (LCD) display is a passive light-emitting display technology, which displays by modulating light emitted by a light-emitting diode (LED) by the liquid crystal layer to form red, green and blue colors through color filters. Therefore, in the conventional LCD display technology, the position of the under-screen camera blocks light transmission of the LED, thereby failing to display.

With regards to this, the industry has also tried to further increase the screen-to-body ratio by making the camera area display, but how to achieve a perfect combination of the camera shooting and the normal display of camera area, there is still no satisfactory solution in the industry.

SUMMARY OF INVENTION

An aspect of the present invention provides a backlight assembly that adopts a novel structural arrangement to control directions of light propagation in a certain area around an under-screen camera, such that the light is evenly distributed over the camera area, and the camera area can still display by a liquid crystal layer of the screen corresponding to where the camera is located, thereby providing a new type of under-screen camera solution.

The technical solutions adopted by the present invention are as follows:

A backlight assembly comprising a camera area, the backlight assembly comprising: a substrate layer; a reflective layer disposed on the substrate layer; and an optical layer disposed on the reflective layer; wherein the optical layer is provided with a through hole in the camera area, an annular light-guide film circles a peripheral of the through hole, and an inner ring of the light-guide film is concentrically arranged with the through hole.

It is known that a light-guide film is generally made of a material including an organic material, and can realizes control of the light-emitting direction by designing change in a microstructure in the light-guide film. In the present invention, by introducing the light guiding film, it is possible to control the change of the exiting intensity of the incident light in the through hole along certain directions. The intensity of the light at different angles can be controlled by cleverly designing the internal structure of the light-guide film. Based on this function of the light-guide film, the light-guide film (LGF) is very suitable for the under-screen camera technology. Adding an annular LGF around the camera area can disperse the light around the camera area to a top of the camera. After the light enters a liquid crystal display (LCD) panel, display function can be achieved by the regulation of a liquid crystal layer, thereby achieving a true full-screen effect.

Further, in different embodiments, the light-guide film has a thickness ranging from 50 µm to 200 µm.

Further, in different embodiments, the inner ring of the light-guide film has a radius r1 greater than or equal to 2.5 mm, and an outer ring of the light-guide film has a radius less than or equal to 3 mm, but is not particularly limited thereto.

Further, in different embodiments, the optical layer comprises a fluorescent layer, a diffusion layer, and a brightness enhancing layer, wherein the light-guide film is disposed in the fluorescent layer.

Further, in different embodiments, the optical layer comprises a fluorescent layer, a diffusion layer, and a brightness enhancing layer, wherein the light-guide film is disposed in the brightness enhancing layer.

Further, in different embodiments, the optical layer comprises a light guide plate layer, a diffusion layer, and a brightness enhancement layer, and the light-guide film is disposed in the diffusion layer.

Further, in different embodiments, the optical layer comprises a light-guide plate layer, a diffusion layer, and a brightness enhancement layer, and the light-guide film is disposed in the brightness enhancement layer.

Further, another aspect of the present invention provides a display device including a display panel and the backlight assembly according to the present invention.

Further, in different embodiments, the backlight assembly is a direct type backlight assembly, and the optical layer comprises a fluorescent layer, a diffusion layer, and a brightness enhancing layer, wherein the light-guide film is disposed in the brightness enhancing layer; wherein the direct type backlight assembly comprises an light-emitting diode (LED) disposed on the reflective layer. A short-wavelength excitation light emitted by the LED is firstly uniformly mixed after a light-guide process through the light-guide film, and then a long-wavelength light is excited through the fluorescent layer.

Further, in different embodiments, the backlight assembly is a direct type backlight assembly, the optical layer comprises a fluorescent layer, a diffusion layer, and a brightness enhancing layer, wherein the light-guide film is disposed in the brightness enhancing layer; wherein the direct type backlight assembly comprises an light-emitting diode (LED) disposed on the reflective layer. A short-wavelength excitation light emitted by the LED firstly excites a long-wavelength light through the fluorescent layer, and then the light is dispersed through the diffusion layer and subjected to a light-guide process through the light-guide film.

Further, in different embodiments, LEDs disposed in the camera area of the backlight assembly include LEDs of R\G\B three colors.

Further, in various embodiments, LEDs disposed in the camera area of the backlight assembly include monochrome LEDs.

Further, in different embodiments, the backlight assembly is a side-lit backlight assembly, and the optical layer comprises a light-guide plate layer, a diffusion layer, and a brightness enhancement layer, and the light-guide film is disposed in the diffusion layer Further, in different embodiments, the backlight assembly is a side-lit backlight assembly, and the optical layer comprises a light-guide plate layer, a diffusion layer, and a brightness enhancement layer, and the light-guide film is disposed in the brightness enhancement layer.

Further, in different embodiments, the display panel is a passive display panel, including but not particularly limited to, a liquid crystal display panel.

Further, still another aspect of the present invention provides a terminal device including the display device according to the present invention and a camera, wherein the camera is disposed corresponding to the camera area. Specifically, the terminal device may be any smart terminal device that needs to use an under-screen image-capturing solution, such as a smart phone, a smart tablet, and a computer, etc., but is not particularly limited thereto.

The invention relates to a backlight assembly which uses a light-guide film (LGF) formed by a light-guide film material, to control a direction of light propagation in a certain area around the under-screen camera, such that the light can be evenly distributed on a top of the camera, and after the light enters the liquid crystal layer of the display screen, display function can be achieved, thereby realizing a true full-screen effect, providing a new type of under-screen camera solution.

Further, the light-guide film also has following advantages:

1. The light-guide film material is light in weight and thin in thickness, and is easy to be integrated into the current display technology, thus having a wide application range.

2. low production cost, simple process, and easy to mass production.

3. It will not change the current production and processing of the display panel, making it easy to promote and apply.

BRIEF DESCRIPTION OF DRAWINGS

In order to more clearly illustrate the embodiments or the technical solutions of the existing art, the drawings illustrating the embodiments or the existing art will be briefly described below. Obviously, the drawings in the following description merely illustrate some embodiments of the present invention. Other drawings may also be obtained by those skilled in the art according to these figures without paying creative work.

DETAILED DESCRIPTION OF PREFERRED EMBODIMENTS

The technical solutions of a backlight assembly, a display device thereof and an application thereof in a terminal according to the present invention will be further described in detail below with reference to the accompanying drawings and embodiments.

Since the solutions involved in the present invention include a backlight assembly, a display device thereof and an application thereof in a terminal, and the above three aspects are sequentially inclusive, that is, the application in a terminal includes the display device, and the display device further includes the backlight assembly. In order to avoid unnecessary repetition and clear description, the description of this embodiments provided below is exemplified by the application in the terminal according to the present invention, and the display device and the backlight assembly thereof are described in detail.

Figure 1:
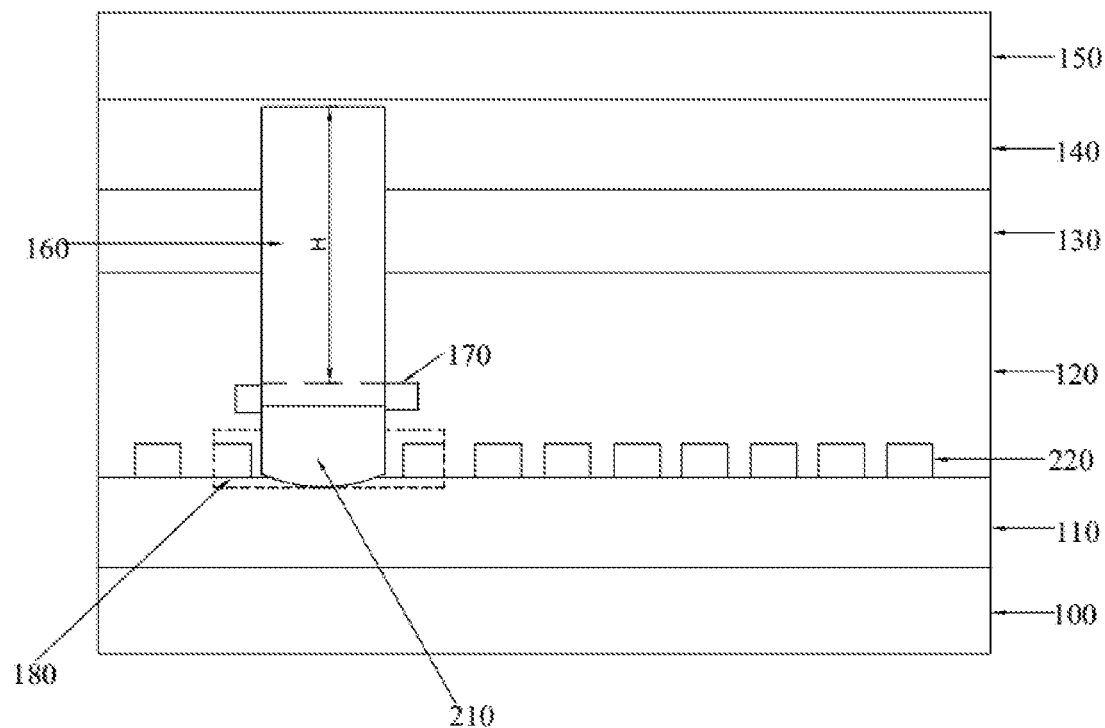
FIG. 1 is a schematic structural diagram of a terminal device according to an embodiment of the present invention, in which only a cross-sectional structure at a position of a camera area thereof is illustrated.

Referring to FIG. 1, an embodiment of the present invention provides a terminal device including a display device and a camera 210.

The display device includes a camera area corresponding to the position of the camera 210, and includes a display panel 150 and a backlight assembly according to the present invention, wherein the display panel 150 is disposed on the backlight assembly, which is preferably a liquid crystal panel 150, but not particularly limited to.

The backlight assembly includes a substrate layer 100 for driving a light source unit, such as an array of LEDs. A reflective layer 110 is disposed on the substrate layer 100, and an optical layer is disposed on the reflective layer 110. The optical layer is provided with a through hole 160 in a camera area, and an annular light-guide film 170 circles a peripheral of the through hole 160, wherein an inner ring of the light-guide film 170 is concentrically arranged with the through hole 160, and the camera 210 is disposed below the through hole 160.

Further, in this embodiment, the optical layer includes a fluorescent layer 120, a diffusion layer 130, and a brightness enhancement layer 140. The light-guide film 170 is disposed in the fluorescent layer 120 and has a thickness ranging from 50 μm to 200 μm.

Figure 2:
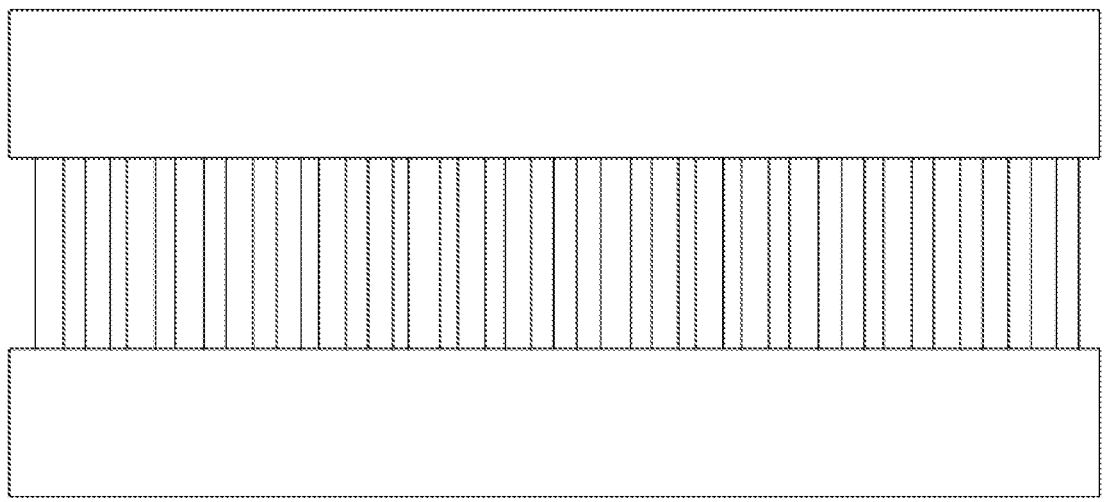
FIG. 2 is a schematic diagram showing a microstructure of a light-guide film shown in FIG. 1, which is symmetrically distributed.
Figure 3:
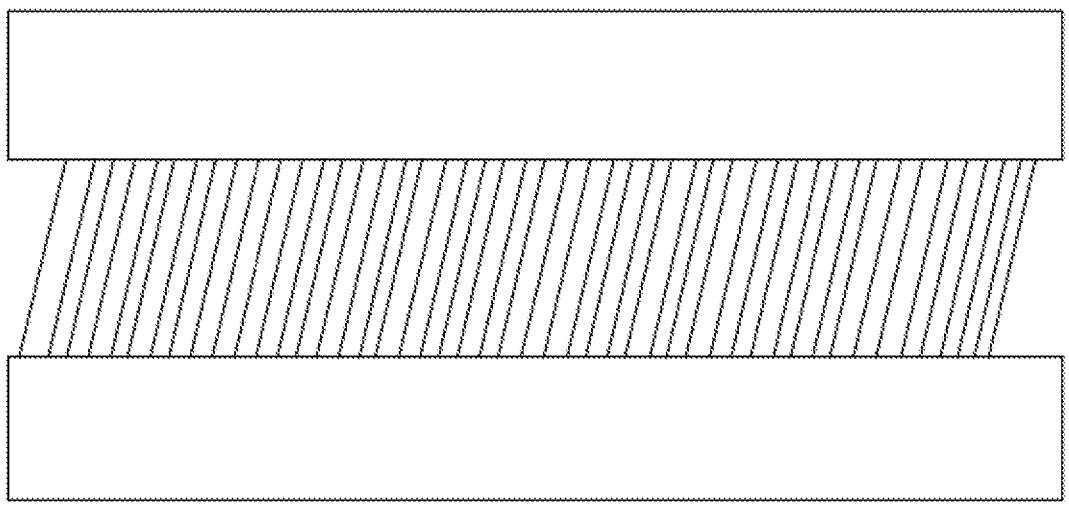
FIG. 3 is a schematic diagram showing a microstructure of a light-guide film shown in FIG. 1, which is asymmetrically distributed.
Figure 4:
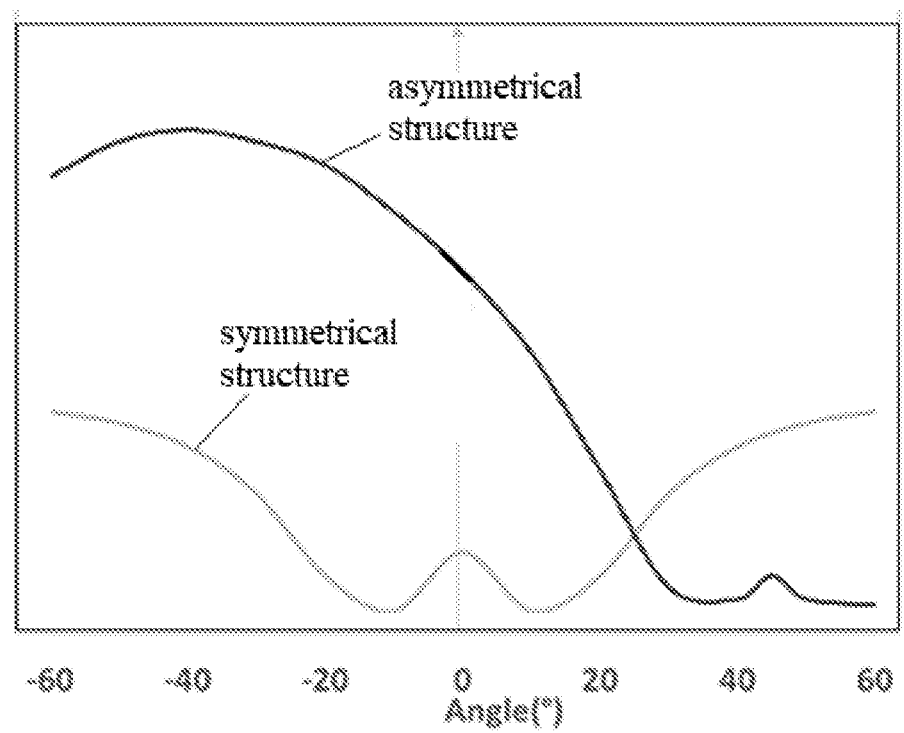
FIG. 4 is a schematic diagram showing effect for light control states of the light-guide film shown in FIG. 1 using the symmetrically distributed microstructure and the asymmetrically distributed microstructure.
Figure 5:
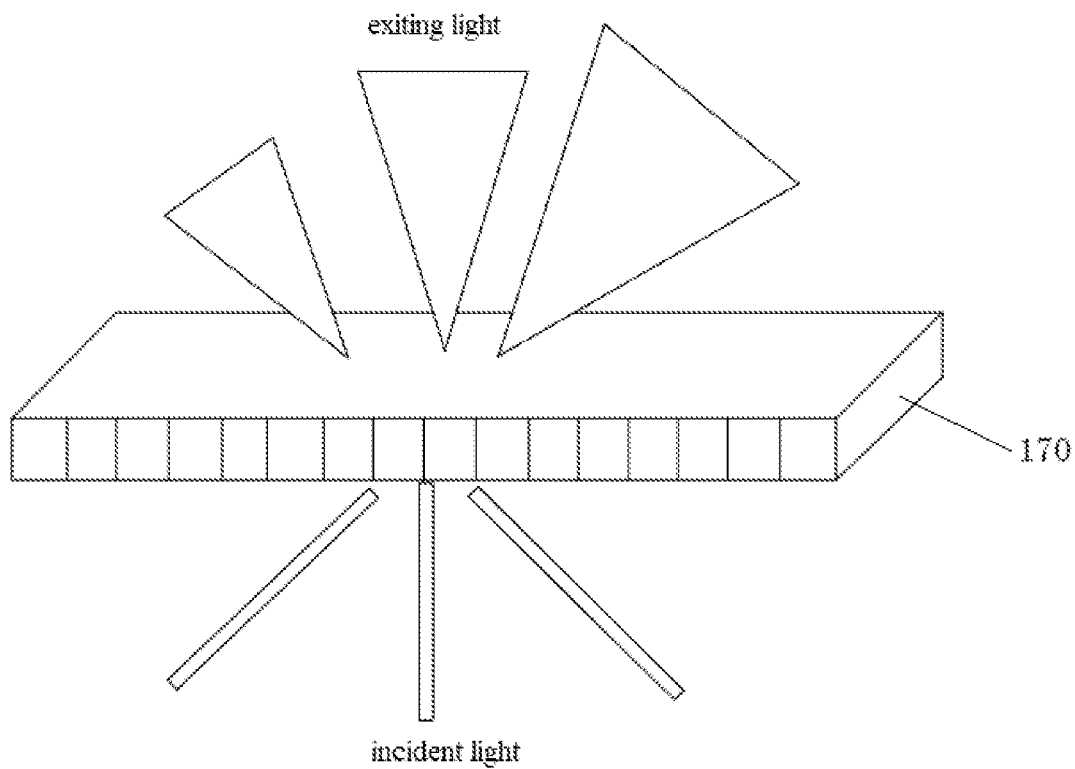
FIG. 5 is a schematic diagram showing effect for light control states for incident light and exiting light of the light-guide film shown in FIG. 1.

It is known that a light-guide film is generally made of a material including an organic material, and by designing a microstructure change in the light-guide film, control of a light exiting direction of the incident light can be realized. For example, it may be a symmetrically distributed microstructure or an asymmetrically distributed microstructure as shown in FIGS. 2 and 3, respectively. The control effects of the light-guide films of the symmetrically distributed microstructure and the asymmetrically distributed microstructure are shown in FIG. 4. Further, FIG. 5 also illustrates a specific functional diagram of the light-guide film 170 for incident light and exiting light.

Based on this function of the light-guide film, the light-guide film (LGF) 170 is very suitable for the under-screen camera technology. The annular light-guide film 170 is added around the area where the camera 210 is located, and the light around the area where the camera 210 is located can be dispersed to a top of the camera 210. After the light enters the liquid crystal panel 150, display function can be carried out by regulation by the liquid crystal panel 150, thereby achieving a true full screen effect.

Further, the backlight assembly is a direct type backlight assembly, including a light-emitting diode (LED) 220 disposed on the reflective layer 110. As shown in FIG. 1, a short-wavelength excitation light emitted by the LED 220 is firstly uniformly mixed after a light-guide process through the light-guide film 170, then a long-wavelength light is excited through the fluorescent layer 120, and then the long-wavelength light enters into the liquid crystal panel 150.

The dispersion and homogenization effect of the light-guide film (LGF) 170 requires a certain vertical distance, wherein the longer the vertical distance, the better the light homogenizing effect, and the vertical distance refers to a distance from an upper surface of the LGF 170 to an underside of the liquid crystal panel 150, specifically as designated by a reference symbol H in the figure. However, according to different embodiments, a specific value of the vertical distance is determined according to different specific embodiments, and is not particularly limited.

Further, as shown in FIG. 1, the annular light-guide film 170 is configured to uniformly mix the light of the underlying LED at the display panel above the camera 210. Therefore, an outer diameter r2 of the annular light-guide film 170 needs to be slightly larger than a length and a width of the LED, and in order to avoid obscuring a photographing function of the underlying camera 210, an inner diameter r1 of the annular light-guide film 170 needs to be slightly larger than a radius of the camera. Since a general diameter of the camera is less than 5 mm, so an inner ring of the light-guide film has a radius r1 greater than 2.5 mm. Further, since a general diameter of the LED is greater than 0.05 mm and less than 0.5, an outer ring of the light-guide film has a radius r2 preferably less than 3 mm. Of course, in different embodiments, the specific radius of the inner and outer rings of the light-guide film is determined according to specific conditions, and is not particularly limited.

Figure 6:
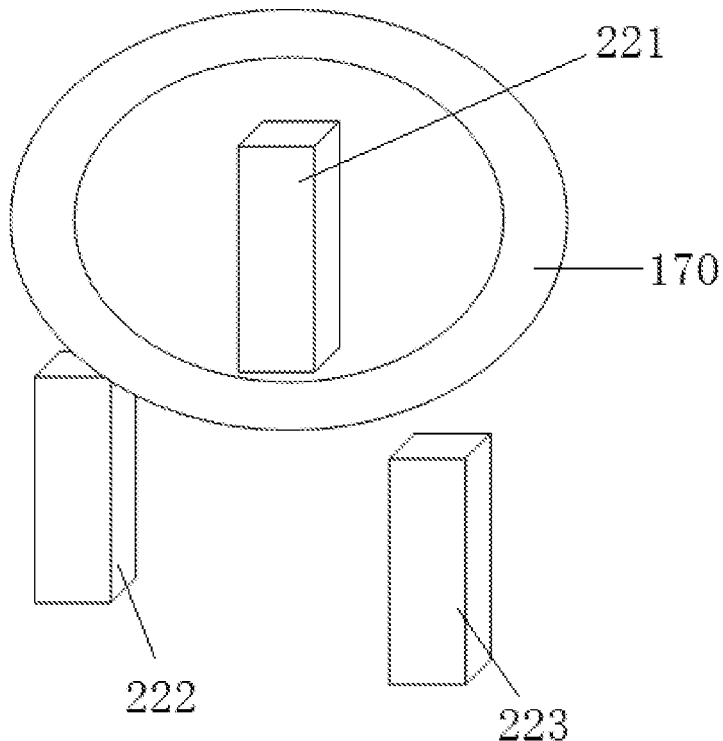
FIG. 6 is a schematic diagram showing a positional relationship between LEDs and a light-guide film in the camera area shown in FIG. 1.

The backlight assembly is the LEDs disposed in the corresponding camera area, that is, the LEDs in the area circled by a frame line 180 in FIG. 1, which may include LEDs of R\G\B three colors, and a positional relationship between the LEDs and the light-guide film can be referred to FIG. 6.

As shown in FIG. 6, wherein LEDs of R\G\B three colors 221, 222, 223 are annularly disposed around the annular light-guide film 170. Further, in other embodiments, the LEDs of the backlight assembly disposed in the camera area may be also be monochrome LEDs. If a scheme of the monochrome LEDs is selected, it also has the advantages of reducing the process cost and the circuit design difficulty. However, a specific choice of LEDs of three colors or a single color can be determined as needed, and is not particularly limited.

Figure 7:
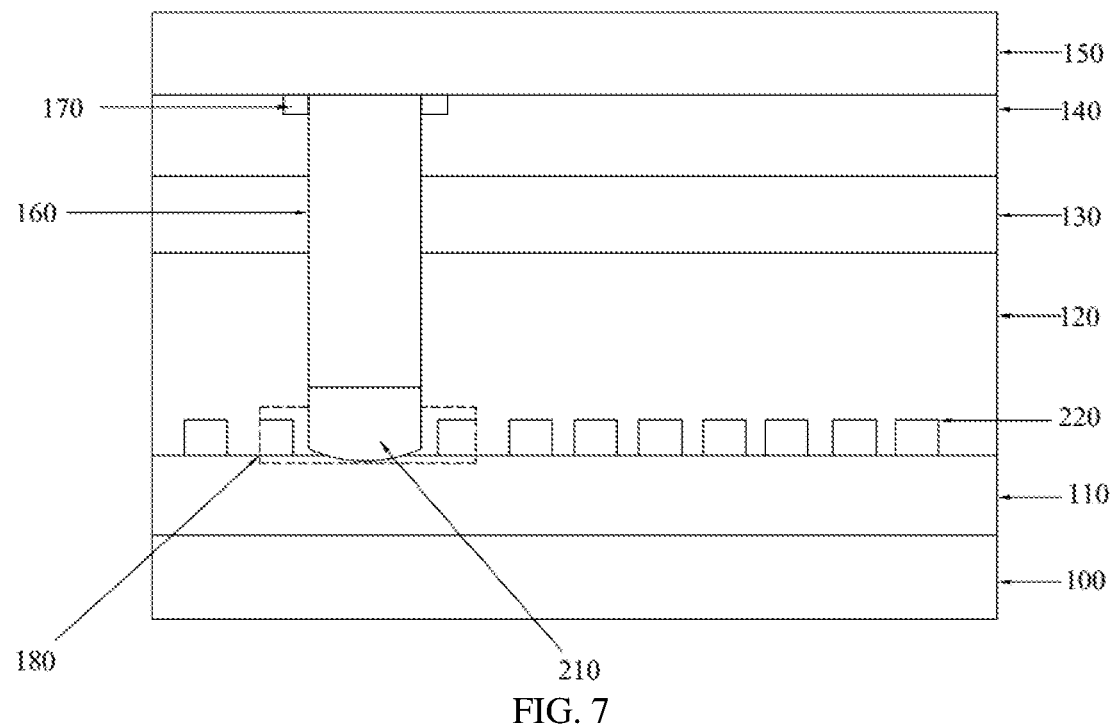
FIG. 7 is a schematic structural diagram of a terminal device according to another embodiment of the present invention, in which only a cross-sectional structure at a position of a camera area thereof is illustrated.

Further, please refer to FIG. 7, which illustrates a schematic structural diagram of a terminal device according to further another embodiment of the present invention, in which only a cross-sectional structure at a position of a camera area thereof is illustrated. It is substantially the same as the terminal device structure shown in FIG. 1, except for the position of the light-guide film 170.

As shown in FIG. 7, wherein the light-guide film 170 is disposed in the brightness enhancing layer 140 in the optical layer. A short-wavelength excitation light emitted by the LED 220 firstly excites a long-wavelength light through the fluorescent layer, and then the light is dispersed through the diffusion layer and subjected to a light-guide process through the light-guide film 170, and then enters the liquid crystal panel 150.

Figure 8:
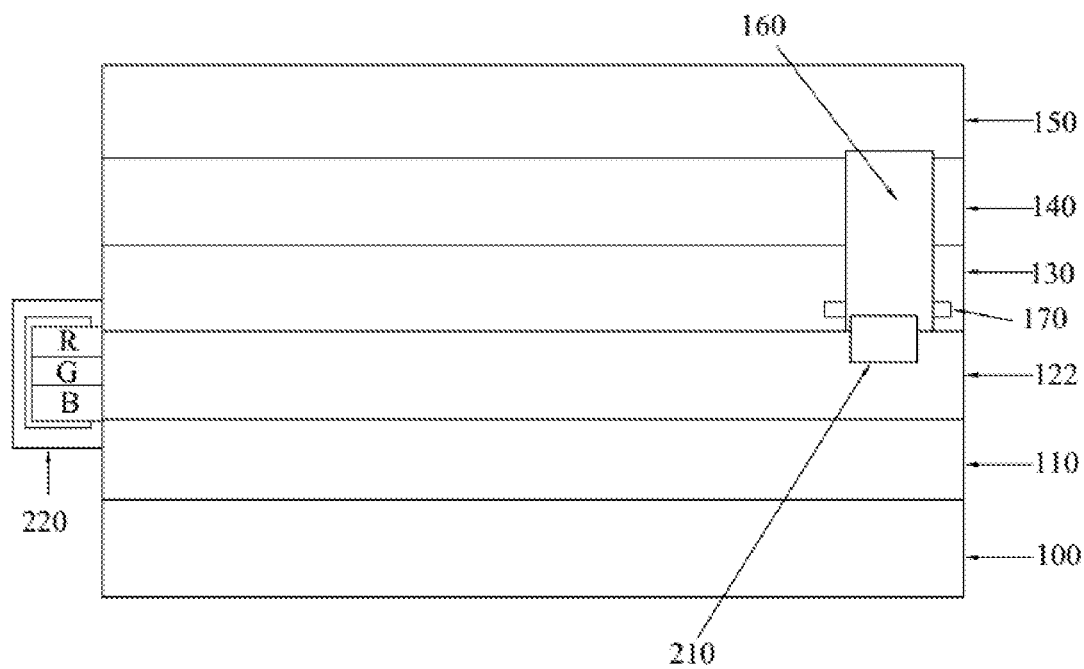
FIG. 8 is a schematic structural diagram of a terminal device according to still another embodiment of the present invention, in which only a cross-sectional structure at a position of a camera area thereof is illustrated.

Further, please refer to FIG. 8, which illustrates a schematic structural diagram of a terminal device according to still another embodiment of the present invention, in which only a cross-sectional structure at a position of a camera area thereof is illustrated. It is substantially the same as the terminal device structure shown in FIG. 1, except that the backlight assembly adopts a side-lit backlight assembly, and a resulting composition of the optical layer is different.

As shown in FIG. 8, the optical layer includes a light-guide plate layer 122, a diffusion layer 130, and a brightness enhancement layer 140, wherein the light-guide film 170 is disposed in the diffusion layer 130.

Figure 9:
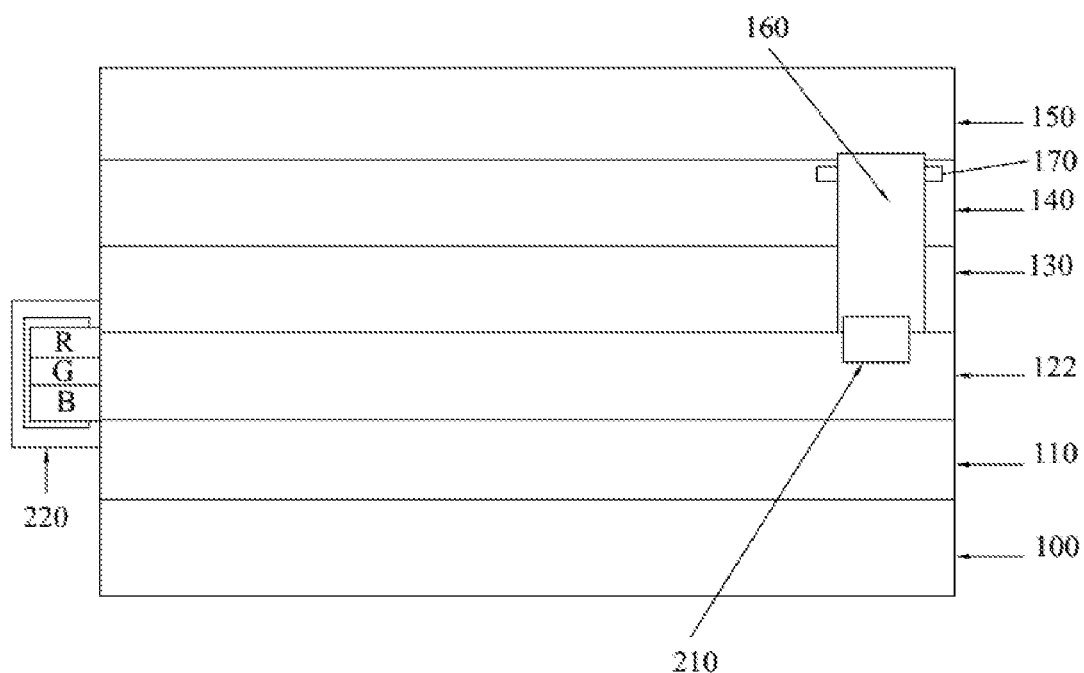
FIG. 9 is a schematic structural diagram of a terminal device according to further another embodiment of the present invention, in which only a cross-sectional structure at a position of a camera area thereof is illustrated.

Further, please refer to FIG. 9, which illustrates a schematic structural diagram of a terminal device according to also another embodiment of the present invention, in which only a cross-sectional structure at a position of a camera area thereof is illustrated. This is substantially the same as the terminal device structure shown in FIG. 8, except for the position of the light-guide film 17. As shown in FIG. 9, the light-guide film 17 is disposed in the brightness enhancing layer 140.

The invention relates to a backlight assembly which uses a light-guide film (LGF) formed by a light-guide film material, to control a direction of light propagation in a certain area around the under-screen camera, such that the light can be evenly distributed on a top of the camera, and after the light enters the liquid crystal layer of the display screen, display function can be achieved, thereby realizing a true full-screen effect, providing a new type of under-screen camera solution.

Further, the light-guide film also has following advantages:

1. The light-guide film material is light in weight and thin in thickness, and is easy to be integrated into the current display technology, thus having a wide application range.

2. low production cost, simple process, and easy to mass production.

3. It will not change the current production and processing technology of the display panel, making it easy to promote and apply.

The technical scope of the present invention is not particularly limited to the above description, and those skilled in the art can make various modifications and changes to the above embodiments without departing from the technical idea of the present invention. Such variations and modifications are intended to be within the scope of the invention.

What is claimed is:

1. A backlight assembly having a camera area, the backlight assembly comprising:
    a substrate layer;
    a reflective layer disposed on the substrate layer; and
    an optical layer disposed on the reflective layer, the optical layer provided with a through hole corresponding to the camera area; and
    an annular light-guide film circling a peripheral of the through hole, wherein an inner ring of the annular light-guide film is concentrically arranged with the through hole.

2. The backlight assembly according to claim 1, wherein the annular light-guide film has a thickness ranging from 50 μm to 200 μm.

3. The backlight assembly according to claim 1, wherein the optical layer comprises a fluorescent layer, a diffusion layer, and a brightness enhancing layer, wherein the annular light-guide film is disposed in the fluorescent layer.

4. The backlight assembly according to claim 1, wherein the optical layer comprises a fluorescent layer, a diffusion layer, and a brightness enhancing layer, wherein the annular light-guide film is disposed in the brightness enhancing layer.

5. The backlight assembly according to claim 1, wherein the optical layer comprises a light-guide plate layer, a diffusion layer, and a brightness enhancing layer, and the annular light-guide film is disposed in the diffusion layer.

6. The backlight assembly according to claim 1, wherein the optical layer comprises a light-guide plate layer, a diffusion layer, and a brightness enhancing layer, and the annular light-guide film is disposed in the brightness enhancing layer.

7. A display device, comprising a display panel and the backlight assembly according to claim 1.

8. The display device according to claim 7, wherein the backlight assembly is a direct type backlight assembly, and the optical layer comprises a fluorescent layer, a diffusion layer, and a brightness enhancing layer, wherein the annular light-guide film is disposed in the fluorescent layer or in the brightness enhancing layer, wherein the direct type backlight assembly comprises an LED disposed on the reflective layer.

9. The display device according to claim 7, wherein the backlight assembly is a side-lit backlight assembly, and the optical layer comprises a light-guide plate layer, a diffusion layer, and a brightness enhancing layer, wherein the annular light-guide film is disposed in the diffusion layer or in the brightness enhancing layer.

10. A terminal device, comprising the display device according to claim 7 and a camera, wherein the camera is disposed corresponding to the annular light-guide film of the backlight assembly of the display device.

* * * * *

UNITED STATES PATENT AND TRADEMARK OFFICE
CERTIFICATE OF CORRECTION

PATENT NO. : 10,901,261 B1
APPLICATION NO. : 16/638759
DATED : January 26, 2021
INVENTOR(S) : Guiyang Zhang It is certified that error appears in the above-identified patent and that said Letters Patent is hereby corrected as shown below:

On the Title Page

Assignee (73):
Change: WUHAN CHINA OPTOELECTRONICS TECHNOLOGY CO, LTD., Hubei (CN)
To: WUHAN CHINA STAR OPTOELECTRONICS TECHNOLOGY CO, LTD., Hubei (CN)

Signed and Sealed this
Second Day of August, 2022

Katherine Kelly Vidal
*Director of the United States Patent and Trademark Office*